July 7, 1959 W. O. SEXAUER 2,893,534
PANNER FOR TWISTED BREAD
Filed Nov. 4, 1954
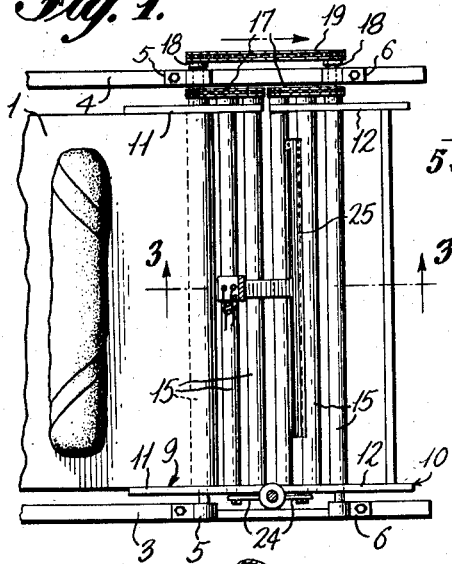
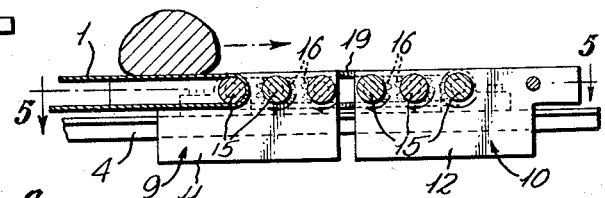
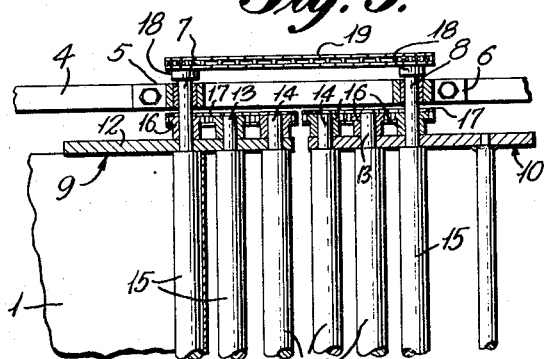
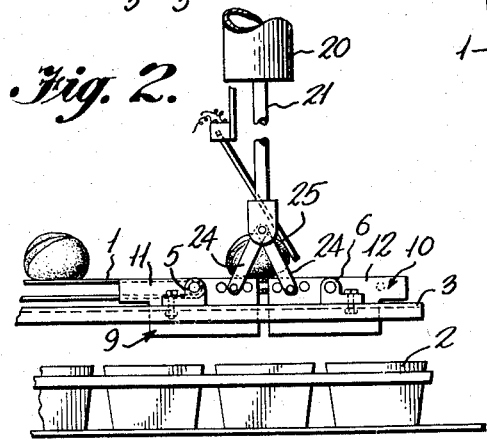
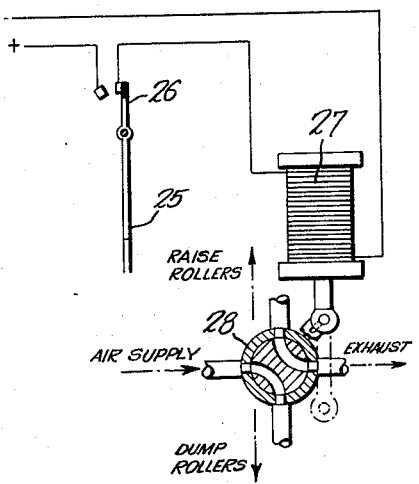
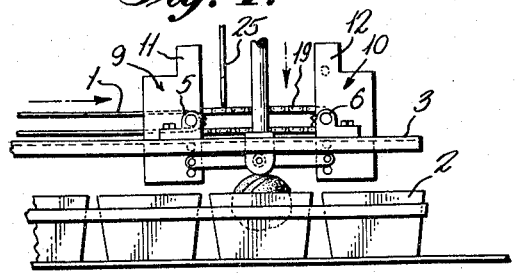
INVENTOR
William O. Sexauer
BY Mason, Fenwick & Lawrence
ATTORNEYS

2,893,534

PANNER FOR TWISTED BREAD

William O. Sexauer, Dallas, Tex., assignor to The J. H. Day Company, Incorporated, Norwood, Ohio, a corporation of Ohio Application November 4, 1954, Serial No. 466,884

10 Claims. (Cl. 198—21)

This invention relates to automatic panners for twisted bread. This type of bread, as is known to all skilled in the art, is formed by twisting together two lengths of dough to form the loaf. Since the latter is thus made of two weakly cohering components, it has much less shape-retaining stiffness than the customary one-piece loaf, and consequently, is readily deformed so that great care must be exercised in placing the loaf in the pan. While conventional mechanical panners in which the loaves are carried on a belt conveyor to a dumping station may be adequate for ordinary loaves, they are not suitable for twisted loaves, since the latter must be delivered to the pan without being subjected to any unbalanced lateral pressures which would cause them to deform and even cause the displacement of the two components. Insofar as my knowledge of the conventional panning devices go, these comprise chuting means or guide means or fall retarding devices, all of which subject the loaf to unbalanced pressure, and which may cause it to strike the bottom of the pan in tilted position.

The object of the present invention is to provide a panner which includes means at the dumping station for supporting the loaf, and constructed and operated to fall suddenly from beneath the loaf, leaving it unsupported, the object being to exclude any structure from the path of free fall of the unsupported loaf so that it reaches the pan in level position and without having had its shape affected by any unbalanced lateral pressure during the period of its gravitational descent.

Other objects of the invention will appear as the following description of a practical embodiment thereof proceeds.

In the drawing which accompanies and forms a part of the following specification, and throughout the figures of which the same characters of reference have been employed to denote identical parts:

Figure 1 is a plan view of the subject panner, a part of the belt conveyor being omitted;

Figure 2 is a side elevation of the structure shown in Figure 1;

Figure 3 is a detail in section, taken along the line 3—3 of Figure 1, showing the gates at the dumping station, closed;

Figure 4 is a similar view showing the gates open;

Figure 5 is a horizontal section taken along the line 5—5 of Figure 3;

Figure 6 is a diagrammatic view showing the electrical connections to the solenoid valve for opening the air cylinder, and to the control switches.

Referring now in detail to the several figures, the numeral 1 represents portion of a belt conveyor, upon the upper flight of which the loaves are made and carried to a dumping station, beneath which is the pan 2, which in general comprises several compartments, in each of which a loaf is deposited. The manner of advancing the pans so that a compartment is in readiness to receive a loaf when dropped from the dumping station, is not part of the present invention and is not disclosed. The pans could be positioned manually in the path of descent of the loaves. A pair of horizontal parallel supports 3 and 4 are adjacent the sides of the belt conveyor at the end shown, which extend forwardly of said end. These supports carry bearings 5 and 6 for shafts 7 and 8, upon which the gates 9 and 10 are journaled. Said gates are substantially identical, each consisting of a pair of end plates 11 and 12 at opposite sides of the belt conveyor, bridged equidistantly by the parallel shafts 7 and 8 which have already been mentioned, and the shafts 13 and 14. All of said shafts carry rollers 15 of uniform diameter, the ends of which lie adjacent the end plates 11 and 12. Thus, each of the gates 9 and 10 carry a set of three rollers. The extended portions of the rollers of each set carry sprockets 16, said rollers being engaged by the chain 17, so that they rotate in the same direction. The shafts 7 and 8 are extended beyond the support 4. Each of said shafts carries a sprocket 18 at its outer end, said sprockets being connected by the chain 19. It is thus apparent that the rollers of both gates travel in the same direction, and that the driving connection between the rollers of a set and between both sets remains operative, regardless of the swing of the gates about the shafts 7 and 8.

The conveyor belt 1 passes about the adjacent roller 15 in frictional driving engagement therewith, so that the rollers of both gates rotate at the same peripheral speed as the speed of the belt conveyor.

The gates normally occupy a horizontal position, as shown in Figures 1, 2, 3 and 5, in which position the rollers 15 are tangent to the plane of the surface of the upper flight of the conveyor belt 1. Said gates can swing from this position to a position perpendicular thereto. The gates are operated pneumatically through the air cylinders 20, there being one at each side, each having a piston therein, not shown, and a rod 21. Said rod is connected to the respective end plates 11 and 12 by means of the links 24. When the air cylinders are operated to move the rods 21 downward, the links tilt the gates in a downward direction and at the same time separate them until they assume the perpendicular position shown in Figure 4, leaving an unrestricted passage therebetween for the passage of a twisted loaf. When the rods 21 are moved in an upward direction, the links pull the gates up into their normal horizontal closed position.

The operation of the panner is as follows. The loaves are made up directly on the belt conveyor by operators standing at one or both sides thereof, the conveyor continually moving the loaves toward the dumping station represented by the gates 9 and 10. Since the belt conveyor and the rollers are travelling at the same speed and in the same direction, the loaf will readily be transferred to the rollers 15 without any lateral pressure being brought upon it. Just before the loaf reaches the line of separation between the adjacent edges of the gates, it encounters a light arm 25, which first straightens the loaf if it is in inclined position on the conveyor, and then operates a switch 26 (see Figure 6) to close the circuit through the solenoid valve 27, that actuates the air valve 28 to force the rod 21 in a downward direction. By the time the rod 21 is in motion, the loaf is precisely at the middle point in the area of the two gates. Closure of the circuit controlled by the switch 26 energizes the air cylinder to force the rod 21 down, suddenly opening the gates 11 and 12, which simultaneously fall from under the loaf and assume the vertical position shown in Figure 4. The unsupported loaf, retaining its level attitude, falls through the space between the gates and lands in the underlying pan in a completely level state and without having been contacted during its descent by any structure which could change its shape or possibly disintegrate it.

The switch 26 opens the circuit gravitationally by swinging to a vertical position when released from contact with the loaf, and the solenoid is of the type in which the armature is retracted by a spring. Thus, when the loaf has dropped below the plane of the normally closed gates, it parts contact with the switch, which then proceeds to open the circuit gravitationally. There is enough lag in the switch, solenoid and valve operation to assure that the loaf will have passed below the vertically positioned gates 9 and 10 by the time they respond to the de-energization of the circuit, and close. The specific nature of the means for controlling the operation of the gates is not material to the invention.

While I have in the above description disclosed what I believe to be a preferred and practical embodiment of the invention, it will be understood by those skilled in the art that the specific details of construction and arrangement of parts, as shown and described, are by way of illustration and not to be construed as limiting the scope of the invention as claimed.

What I claim is:

1. Panner for twisted bread comprising a loaf dumping unit, said unit including a pair of gates hinged on spaced parallel axes, normally bridging the space between said axes, said gates each including a set of loaf-supporting rollers, at least one roller being coaxial with one of the hinged axes, the rollers of both sets being normally tangent to a common plane, a driven belt conveyor having the upper surface thereof substantially in the plane to which said rollers are normally tangent, said belt conveyor passing about the roller which is coaxial with the hinge axis, in driving relation thereto, connections between said last named roller and the other rollers of said sets for driving them at the same peripheral speed as said belt conveyor and in the same direction, means operative responsive to the presence of a loaf when the latter reaches substantially mid-position with respect to the adjacent end rollers of said sets for suddenly and simultaneously tilting said gates downward out of the path of descent of the loaf thus left unsupported.

2. Panner for twisted bread comprising a loaf dumping unit, said unit including a pair of gates hinged on spaced parallel axes, normally bridging the space between said axes, said gates each including a set of loaf-supporting rollers, a roller of each set being coaxial with the respective hinge axis, the rollers of both sets being normally tangent to a common plane, a driven belt conveyor having the upper surface thereof substantially in the plane to which said rollers are normally tangent, said belt conveyor passing about one of the rollers which is coaxial with its corresponding hinge axis, in driving relation thereto, serially connected gears between the rollers of each set and a driving connection between the rollers which are coaxial with the hinge axes, said gears and connection being constructed and arranged to drive said rollers at the same peripheral speed as said belt conveyor and in the same direction, and means operative responsive to the presence of a loaf when the latter reaches substantially mid-position with respect to the adjacent end rollers of said sets, for suddenly and simultaneously tilting said gates downward out of the path of descent of the loaf thus left unsupported.

3. Panner for twisted bread comprising a loaf dumping unit, said unit including a pair of gates hinged on spaced parallel axes, normally bridging the space between said axes, said gates each including a set of loaf-supporting rollers, at least one roller being coaxial with one of the hinged axes, the rollers of both sets being normally tangent to a common plane, a driven belt conveyor having the upper surface thereof substantially in the plane to which said rollers are normally tangent, said belt conveyor passing about the roller which is coaxial with the hinge axis, in driving relation thereto, connections between said last named roller and the other rollers of said sets for driving them at the same peripheral speed as said belt conveyor and in the same direction, a fluid pressure motor for tilting said gates from normal position, downwardly, and means operative responsive to the presence of a loaf when the latter reaches substantially mid-position with respect to the adjacent end rollers of said sets for operating said fluid pressure motor to simultaneously tilt said gates from beneath said loaf and out of the path of descent of the loaf thus left unsupported.

4. Panner for twisted bread as claimed in claim 3, including means responsive to pressure of a gate when in downwardly tilted position for operating said fluid pressure motor to restore said gates to normal position.

5. Panner for twisted bread comprising a belt conveyor revoluble on horizontal axes, and a pair of cooperating gates adjacent one end thereof hinged on horizontal axes, said gates normally bridging the space between their axes, said gates each including a set of loaf supporting rollers, the loaf supporting surface of said conveyor and of the rollers of both sets being normally substantially in a common level plane, means for driving said conveyor and said rollers of both sets at the same peripheral speed and in the same direction, and means operative responsive to the presence of a loaf when the latter reaches substantially midposition with respect to the adjacent end rollers of said sets for suddenly and simultaneously tilting said gates downward out of the path of descent of the loaf thus left unsupported.

6. A device for panning elongated pieces of dough, said device comprising a first conveyor section and a second conveyor section disposed in end to end relationship and defining a path of dough travel extending longitudinally of said conveyor sections, each of said sections including a driven dough supporting surface moving in the path of dough travel, said first conveyor section being pivotally mounted about an axis extending transverse to the path of dough travel and spaced from the second conveyor section, the second conveyor section being pivotally mounted on an axis parallel to the first named axis and spaced from the first conveyor section, whereby the adjacent ends of said conveyor sections are adapted to pivot downwardly, power means for effecting rapid downward movement of the adjacent ends of said conveyor sections, and means for actuating said power means when a dough piece is disposed above the adjacent ends of said conveyor sections.

7. A device for panning elongated pieces of dough, received from a belt conveyor, said device comprising a first conveyor section and a second conveyor section disposed in end to end relationship and defining a path of dough travel extending longitudinally of said conveyor sections, each of said sections including a horizontal driven dough supporting surface moving in the path of dough travel, and disposed at substantially the same height as said belt conveyor, said first conveyor section being pivotally mounted about an axis extending transverse to the path of dough travel and spaced from the second conveyor section, the second conveyor section being pivotally mounted on an axis parallel to the first named axis and spaced from the first conveyor section, whereby the adjacent ends of said conveyor sections are adapted to pivot downwardly, power means for effecting rapid downward movement of the adjacent ends of said conveyor sections, and means for actuating said power means when a dough piece is disposed above the adjacent ends of said conveyor sections.

8. A device for panning elongated pieces of dough, said device comprising a first conveyor section and a second conveyor section disposed in end to end relationship and defining a path of dough travel extending longitudinally of said conveyor sections, each of said sections including plurality of driven dough supporting rollers, said rollers being mounted on axes transverse to the direction of dough travel and rotating so that the upper surface of the rollers moves in the direction of dough travel, said first conveyor section being pivotally mounted on an axis transverse to the path of dough travel, said axis being spaced from the second conveyor section, the second conveyor section being pivotally mounted on an axis parallel to the last named axis and spaced from the first conveyor section, whereby the adjacent ends of said conveyor sections are adapted to pivot downwardly, power means for effecting rapid downward movement of the adjacent ends of said conveyor sections, and means for actuating said power means when a dough piece is disposed above the adjacent ends of said conveyor sections.

9. A device for panning elongated pieces of dough received from a belt conveyor, said device comprising a first conveyor section and a second conveyor section disposed in end to end relationship and defining a path of dough travel extending longitudinally of said conveyor sections, each of said sections including a plurality of driven dough supporting rollers, said rollers being mounted on axes transverse to the direction of dough travel and rotating so that the upper surface of the rollers moves in the direction of dough travel, the upper surfaces of the rollers of each of said sections lying in a substantially horizontal plane forming a continuation of said belt conveyor, said first conveyor section being pivotally mounted on an axis transverse to the path of dough travel, said axis being spaced from the second conveyor section, the second conveyor section being pivotally mounted on an axis parallel to the last named axis and spaced from the first conveyor section, whereby the adjacent ends of said conveyor sections are adapted to pivot downwardly, power means for effecting rapid downward movement of the adjacent ends of said conveyor sections, and means for actuating said power means when a dough piece is disposed above the adjacent ends of said conveyor sections.

10. In a loaf panning device, loaf supporting means comprising two hinged supporting members mounted on horizontally spaced pivotal axes, each of said supporting members having a plurality of rollers mounted in a row thereon, said rollers being rotatable about axes parallel to the pivotal axes of said supporting members, means for rotating the rollers on one of said supporting members in the same direction, power means for rapidly swinging said mounting members downwardly about said axes between a loaf supporting position with said mounting members extending toward each other and the axes of all said rollers in alignment and a dumping position with said mounting members depending from their pivotal axes, and load responsive means for actuating said power means.

References Cited in the file of this patent

UNITED STATES PATENTS

| | | |
|---|---|---|
| 771,089 | Prescott | Sept. 27, 1904 |
| 2,612,983 | Alden | Oct. 7, 1952 |